US00RE44869E

(19) United States
(12) Reissued Patent
Ellison et al.

(10) Patent Number: US RE44,869 E
(45) Date of Reissued Patent: Apr. 29, 2014

(54) DOWN-DRAWABLE, CHEMICALLY STRENGTHENED GLASS FOR COVER PLATE

(75) Inventors: Adam James Ellison, Painted Post, NY (US); Sinue Gomez, Corning, NY (US)

(73) Assignee: Corning Incorporated, Corning, NY (US)

(21) Appl. No.: 13/403,756

(22) Filed: Feb. 23, 2012

Related U.S. Patent Documents

Reissue of:
(64) Patent No.: 7,666,511
Issued: Feb. 23, 2010
Appl. No.: 11/888,213
Filed: Jul. 31, 2007

U.S. Applications:
(60) Provisional application No. 60/930,808, filed on May 18, 2007.

(51) Int. Cl.
*B32B 17/06* (2006.01)
*C03C 3/076* (2006.01)

(52) U.S. Cl.
USPC ..... 428/410; 428/426; 501/65; 501/66; 501/68; 501/69; 501/70; 501/72

(58) Field of Classification Search
None
See application file for complete search history.

(56) References Cited

U.S. PATENT DOCUMENTS 3,287,201 A * 11/1966 Chisholm et al. ..... 428/410
3,451,796 A 6/1969 Mochel
3,485,702 A 12/1969 Mochel
3,524,737 A * 8/1970 Doyle et al. ..... 65/30.14
3,652,303 A 3/1972 Janakirama Rao
3,752,729 A 8/1973 Mochel
3,772,135 A * 11/1973 Hara et al. ..... 428/96
3,778,335 A * 12/1973 Boyd ..... 428/336
3,790,430 A 2/1974 Mochel
3,833,388 A 9/1974 Ohlberg et al.
3,885,976 A 5/1975 Snitzer
3,954,487 A * 5/1976 Gliemeroth et al. ..... 428/410
3,954,656 A 5/1976 Deeg et al.
4,119,760 A 10/1978 Rinehart
4,859,636 A * 8/1989 Aratani et al. ..... 501/72
4,883,523 A * 11/1989 Lee et al. ..... 65/30.14
5,277,946 A 1/1994 Nagai et al.
5,773,148 A * 6/1998 Charrue et al. ..... 428/410

(Continued)

FOREIGN PATENT DOCUMENTS

CN 1230762 10/1999
DE 3212612 A1 10/1983

(Continued)

OTHER PUBLICATIONS

Taiwanese Patent Application 097118303 Search Report.

(Continued)

*Primary Examiner* — David Sample
(74) *Attorney, Agent, or Firm* — LeClairRyan, a Professional Corporation

(57) ABSTRACT

An alkali aluminosilicate glass that is chemically strengthened and has a down-drawable composition. The glass has a melting temperature less than about 1650° C. and a liquidus viscosity of at least 130 kpoise and, in one embodiment, greater than 250 kpoise. The glass undergoes ion exchange at relatively low temperatures to a depth of at least 30 μm.

75 Claims, 1 Drawing Sheet

(56) References Cited

U.S. PATENT DOCUMENTS

| | | | | |
|---|---|---|---|---|
| 5,804,317 | A | 9/1998 | Charrue | |
| 5,895,768 | A * | 4/1999 | Speit | 428/846.9 |
| 6,259,491 | B1 | 7/2001 | Ekedahl et al. | |
| 6,461,736 | B1 | 10/2002 | Nagashima et al. | |
| 6,518,211 | B1 * | 2/2003 | Bradshaw et al. | 501/69 |
| 6,630,228 | B1 | 10/2003 | Jarnebrink et al. | |
| 7,192,898 | B2 | 3/2007 | Mori et al. | |
| 7,309,671 | B2 * | 12/2007 | Kurachi et al. | 501/70 |
| 2001/0049327 | A1 * | 12/2001 | Hachitani | 501/69 |
| 2003/0076027 | A1 * | 4/2003 | Kuroki et al. | 313/477 R |
| 2004/0063564 | A1 | 4/2004 | Kawai et al. | |
| 2008/0020919 | A1 * | 1/2008 | Murata | 501/66 |

FOREIGN PATENT DOCUMENTS

| | | | | |
|---|---|---|---|---|
| EP | 1116699 | | 2/2006 | |
| EP | 1116699 | B1 | 2/2006 | |
| GB | 1212123 | | 11/1970 | |
| GB | 2335423 | | 9/1999 | |
| GB | 2335423 | A | 9/1999 | |
| JP | 58-185451 | | 10/1983 | |
| JP | 1-167245 | | 6/1986 | |
| JP | 1-167245 | A | 6/1989 | |
| JP | 11328601 | A * | 11/1999 | G11B 5/02 |
| JP | 3454242 | | 10/2003 | |
| JP | 3465642 | | 11/2003 | |
| JP | 2007099557 | A * | 4/2007 | |

OTHER PUBLICATIONS

Machine Translation of JP58-185451, (Oct. 29, 1983).

Machine Translation of CN1230762, (Oct. 6, 1999).

* cited by examiner

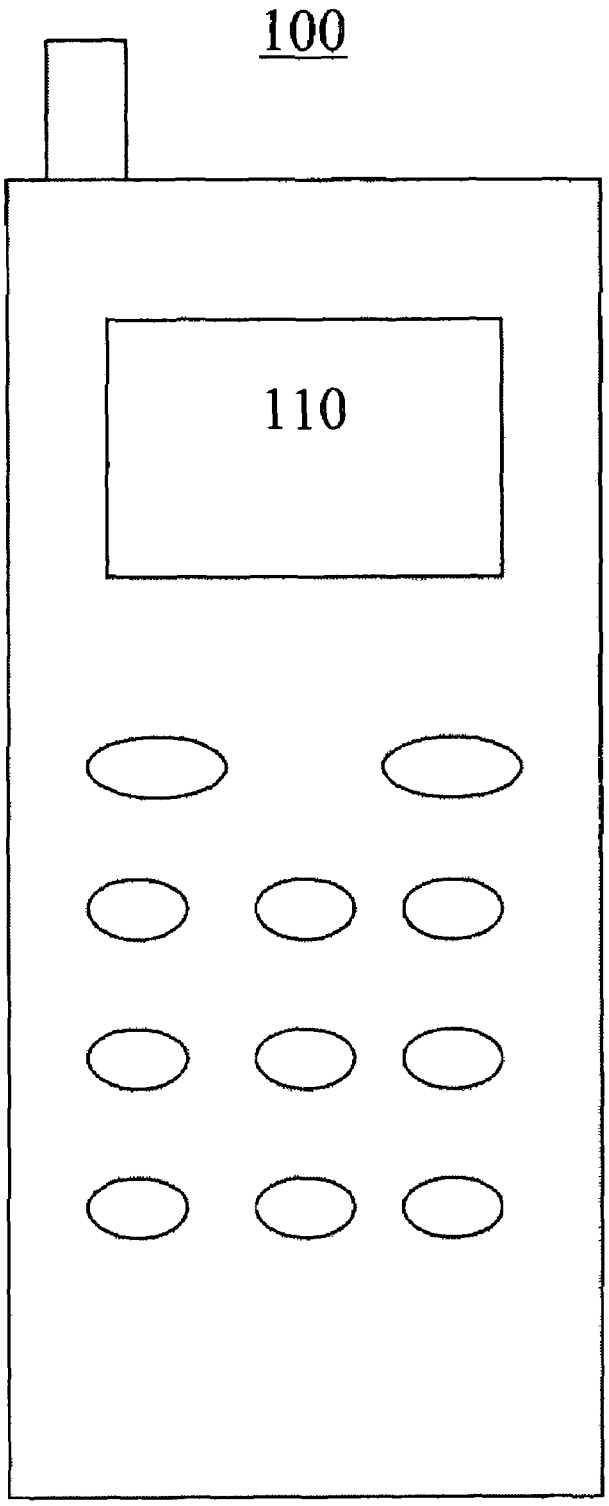
100
110

DOWN-DRAWABLE, CHEMICALLY STRENGTHENED GLASS FOR COVER PLATE

Matter enclosed in heavy brackets [ ] appears in the original patent but forms no part of this reissue specification; matter printed in italics indicates the additions made by reissue.

CROSS REFERENCE TO RELATED APPLICATIONS

This application claims the benefit of U.S. Provisional Application No. 60/930,808, filed May 18, 2007.

TECHNICAL BACKGROUND

The invention relates to an alkali aluminosilicate glass. More particularly, the invention relates to a high strength, down-drawn alkali aluminosilicate glass. Even more particularly, the invention relates to a high strength, down-drawn alkali aluminosilicate glass for use as a cover plate in mobile electronic devices.

Mobile electronic devices, such as personal data assistants, mobile or cellular telephones, watches, laptop computers and notebooks, and the like, often incorporate a cover plate. At least a portion of the cover plate is transparent, so as to allow the user to view a display. For some applications, the cover plate is sensitive to the user's touch. Due to frequent contact, such cover plates must have high strength and be scratch resistant.

The touch sensitive screens of the latest such devices are typically chemically-strengthened, ion-exchangeable "soda-lime" type glasses. These are frequently complicated compositions consisting not only of $Na_2O$ (soda), CaO (lime) and $SiO_2$ (silica), but also include several other oxides such as MgO, $Li_2O$, $K_2O$, ZnO, and $ZrO_2$. These glasses are compatible with large-scale sheet glass manufacturing via floatation on a tin metal bath, but cannot be formed by methods, particularly down-draw processes such as fusion draw and slot draw processes, that are more traditionally associated with precision sheet glass. This is because liquidus temperatures of such soda lime glasses are too high—and their viscosities at the liquidus temperature too low to be compatible with fusion or slot draw processing.

SUMMARY

The present invention provides an alkali aluminosilicate glass that is capable being chemically strengthened by ion exchange and exhibits a composition which can be down-drawn into sheets. The glass has a melting temperature of less than about 1650° C. and a liquidus viscosity of at least 130 kpoise and, in one embodiment, greater than 250 kpoise. The glass can be ion exchanged at relatively low temperatures and to a depth of at least 30 μm.

Accordingly, one aspect of the invention is to provide an alkali aluminosilicate glass having a liquidus viscosity of at least 130 kpoise. The glass comprises: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2+B_2O_3$+CaO≤69 mol %; $Na_2O+K_2O+B_2O_3$+MgO+CaO+SrO>10 mol %; 5 mol %≤MgO+CaO+SrO≤8 mol %; ($Na_2O+B_2O_3$)—$Al_2O_3$≤2 mol %; 2 mol %<$Na_2O$—$Al_2O_3$≤6 mol %; and 4 mol %≤($Na_2O+K_2O$)—$Al_2O_3$≤10 mol %.

Another aspect of the invention is to provide lithium-free glass having a compressive stress of at least 200 MPa, a depth of layer of at least 30 microns, and a thickness of at least 0.3 mm.

Yet another aspect of the invention is to provide a mobile electronic device comprising an alkali aluminosilicate glass cover plate having a liquidus viscosity of at least 130 kpoise. The glass cover plate comprises: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2+B_2O_3$+CaO≤69 mol %; $Na_2O+K_2O+B_2O_3$+MgO+CaO+SrO>10 mol %; 5 mol %≤MgO+CaO+SrO≤8 mol %; ($Na_2O+B_2O_3$)—$Al_2O_3$≤2 mol %; 2 mol %≤$Na_2O$—$Al_2O_3$≤6 mol %; and 4 mol %≤($Na_2O+K_2O$)—$Al_2O_3$≤10 mol %.

Still another aspect of the invention is to provide an alkali aluminosilicate glass cover plate for a device. The glass cover plate has a liquidus viscosity of at least 130 kpoise and comprises: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2+B_2O_3$+CaO≤69 mol %; $Na_2O+K_2O+B_2O_3$+MgO+CaO+SrO>10 mol %; 5 mol %≤MgO+CaO+SrO≤8 mol %; ($Na_2O+B_2O_3$)—$Al_2O_3$≤2 mol %; 2 mol %≤$Na_2O$—$Al_2O_3$≤6 mol %; and 4 mol %≤($Na_2O+K_2O$)—$Al_2O_3$≤10 mol %.

These and other aspects, advantages, and salient features of the present invention will become apparent from the following detailed description, the accompanying drawings, and the appended claims.

BRIEF DESCRIPTION OF THE DRAWINGS

FIG. 1 is a top view of a mobile electronic device having a cover plate comprising an alkali aluminosilicate glass.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values includes both upper and lower limits of the range.

Referring now to FIG. 1, it will be understood that the illustration is for the purpose of describing a particular embodiment of the invention and is not intended to limit the invention thereto.

An alkali aluminosilicate glass (also referred to herein as a "glass") is provided. The glass has a liquidus viscosity of at least 130 kpoise. As used herein, "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. The glass comprises the following oxides, the concentrations of which are expressed in mole percent (mol %): $64 \leq SiO_2 \leq 68$; $12 \leq Na_2O \leq 16$; $8 \leq Al_2O_3 \leq 12$; $0 \leq B_2O_3 \leq 3$; $2 \leq K_2O \leq 5$; $4 \leq MgO \leq 6$; and $0 \leq CaO \leq 5$. In addition, 66 mol $\% \leq SiO_2+B_2O_3+CaO \leq 69$ mol %; $Na_2O+K_2O+B_2O_3+MgO+CaO+SrO > 10$ mol %; 5 mol $\% \leq MgO+CaO+SrO \leq 8$ mol %; $(Na_2O+B_2O_3)—Al_2O_3 \leq 2$ mol %; 2 mol $\% \leq Na_2O—Al_2O_3 \leq 6$ mol %; and 4 mol $\% \leq (Na_2O+K_2O)—Al_2O_3 \leq 10$ mol %. Exemplary compositions of the aluminosilicate glass are listed in Table 1. Table 2 lists compositions that are outside the above range and are deficient in at least one of melting temperature, durability, and/or liquidus viscosity.

TABLE 1

Representative compositions.

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Mol % | | | | | | | | | | | |
| SiO2 | 66.16 | 68 | 66 | 66.16 | 66 | 66 | 65.16 | 66.16 | 66.16 | 66.16 | 66 |
| Al2O3 | 10.9 | 10.9 | 10.9 | 10.9 | 10.9 | 10.9 | 10.9 | 9.9 | 8.9 | 10.9 | 10.9 |
| B2O3 | 0 | 0 | 0 | 0.62 | 0.62 | 0.62 | 0 | 0 | 0 | 1.23 | 1.23 |
| Na2O | 13.41 | 13.41 | 13.41 | 13.41 | 13.41 | 13.41 | 13.41 | 13.41 | 13.41 | 13.41 | 13.41 |
| K2O | 2.33 | 2.33 | 2.33 | 2.33 | 2.33 | 2.33 | 3.33 | 3.33 | 4.33 | 2.33 | 2.33 |
| MgO | 5.72 | 5.72 | 5.72 | 5.72 | 5.72 | 5.72 | 5.72 | 5.72 | 5.72 | 5.72 | 5.72 |
| CaO | 0.62 | 0.62 | 0.62 | 0 | 0 | 0 | 0.62 | 0.62 | 0.62 | 0 | 0 |
| As2O3 | 0.25 | 0.41 | 0 | 0.25 | 0.41 | 0 | 0.25 | 0.25 | 0.25 | 0.25 | 0.41 |
| Sb2O3 | 0 | 0 | 0.41 | 0 | 0 | 0.41 | 0 | 0 | 0 | 0 | 0 |
| SnO2 | 0 | 0 | 0 | 0 | 0 | 0 | 0 | 0 | 0 | 0 | 0 |
| Fe2O3 | 0 | 0 | 0 | 0 | 0 | 0 | 0 | 0 | 0 | 0 | 0 |
| TiO2 | 0.61 | 0.61 | 0.61 | 0.61 | 0.61 | 0.61 | 0.61 | 0.61 | 0.61 | 0 | 0 |
| properties | | | | | | | | | | | |
| strain point | 568 | — | — | — | 573 | — | — | — | 524 | — | — |
| anneal point | 618 | — | — | — | 623 | — | — | — | 571 | — | — |
| softening point | — | — | — | — | — | — | — | — | — | — | — |
| strain | — | — | — | — | — | — | — | — | — | | |
| CTE density | 87.9 | | | | 90.8 | | | | 101.3 | | |
| Viscosity | | | | | | | | | | | |
| T @ 200 p | 1647 | — | — | — | 1635 | — | — | — | 1564 | — | — |
| T @ 35 kp | 1173 | — | — | — | 1165 | — | — | — | 1094 | — | — |
| Liquidus | | | | | | | | | | | |
| internal | 1025 | — | — | — | 1020 | — | — | — | 830 | — | — |
| liq. Visc. | 3.8E +05 | — | — | — | 3.7E +05 | — | — | — | 8.3E +06 | — | — |
| Ion Exchange | | | | | | | | | | | |
| time | — | — | — | — | — | — | — | — | — | — | — |
| Average DOL (μm) | — | — | — | — | — | — | — | — | — | — | — |
| Average $\sigma_t$ (Mpa) | — | — | — | — | — | — | — | — | — | — | — |

| | Example | | | | | | | | | |
|---|---|---|---|---|---|---|---|---|---|---|
| | 12 | 13 | 14 | 15 | 16 | 17 | 18 | 19 | 20 | 21 |
| Mol % | | | | | | | | | | |
| SiO2 | 66 | 66.16 | 66 | 64.16 | 66.16 | 66.02 | 64.745 | 66.15 | 64.45 | 65.7 |
| Al2O3 | 10.9 | 8.9 | 10.9 | 10.9 | 8.9 | 10.94 | 10.97 | 8.943 | 9.695 | 10.92 |
| B2O3 | 1.23 | 1.23 | 1.23 | 1.23 | 1.23 | 1.22 | 2.44 | 1.22 | 1.55 | 1.31 |
| Na2O | 13.41 | 13.41 | 13.41 | 13.41 | 13.41 | 13.46 | 13.49 | 13.44 | 14.14 | 13.43 |
| K2O | 2.33 | 4.33 | 2.33 | 4.33 | 4.33 | 2.355 | 2.36 | 4.285 | 3.785 | 2.33 |
| MgO | 5.72 | 5.72 | 5.72 | 5.72 | 5.72 | 5.5 | 5.52 | 5.66 | 5.44 | 5.86 |
| CaO | 0 | 0 | 0 | 0 | 0 | 0 | 0 | 0 | 0.82 | 0.06 |
| As2O3 | 0 | 0.25 | 0 | 0.25 | 0.25 | 0.395 | 0.395 | 0.395 | 0.397 | 0.37 |
| Sb2O3 | 0.41 | 0 | 0.41 | 0 | 0 | 0 | 0 | 0 | 0 | 0 |
| SnO2 | 0 | 0 | 0 | 0 | 0 | 0 | 0 | 0 | 0 | 0 |
| Fe2O3 | 0 | 0 | 0 | 0 | 0 | 0 | 0 | 0 | 0 | 0.01 |
| TiO2 | 0 | 0 | 0 | 0 | 0 | 0 | 0 | 0 | 0 | 0.02 |
| properties | | | | | | | | | | |
| strain point | — | — | 559 | 550 | 529 | — | — | — | — | 563 |
| anneal point | — | — | 609 | 598 | 575 | — | — | — | — | 613 |
| softening point | — | — | — | — | — | — | — | — | — | 855 |
| CTE | | | 91.4 | 99.2 | 99.5 | — | — | — | — | 2.4 |
| density | | | 2.463 | 2.454 | 2.436 | — | — | — | — | 2.458 |

TABLE 1-continued

Representative compositions.

| | | | | | | | | | | |
|---|---|---|---|---|---|---|---|---|---|---|
| Viscosity | | | | | | | | | | |
| T @ 200 p | — | — | 1624 | 1595 | 1563 | 1635 | 1635 | 1594 | 1536 | 1633 |
| T @ 35 kp | — | — | 1150 | 1126 | 1086 | 1162 | 1162 | 1123 | 1069 | 1151 |
| Liquidus | | | | | | | | | | |
| internal | — | — | 1050 | 725 | 825 | 865 | 870 | 800 | 800 | 1025 |
| liq. Visc. | — | — | 1.8E +05 | 3.3E +07 | 8.4E +06 | 1.7E +07 | 1.7E +07 | 3.7E +07 | 1.0E +07 | 3.0E +05 |
| Ion Exchange | | | | | | | | | | |
| time | — | — | — | — | — | — | — | — | — | — |
| Average DOL (μm) | — | — | — | — | — | — | — | — | — | — |
| Average $\sigma_t$ (Mpa) | — | — | — | — | — | — | — | — | — | — |

| | Example | | | | | | | | | |
|---|---|---|---|---|---|---|---|---|---|---|
| | 22 | 23 | 24 | 25 | 26 | 27 | 28 | 29 | 30 | 31 |
| Mol % | | | | | | | | | | |
| SiO2 | 64.97 | 65.24 | 65.88 | 66.01 | 65.28 | 65.73 | 65.89 | 65.75 | 66.53 | 66.53 |
| Al2O3 | 9 | 9.58 | 10.27 | 9.15 | 11.03 | 10.98 | 10.95 | 11.06 | 10.73 | 10.73 |
| B2O3 | 2.34 | 1.69 | 0.63 | 1.07 | 1.32 | 1.32 | 0 | 0 | 0.5 | 1 |
| Na2O | 14.38 | 14.38 | 13.91 | 13.49 | 13.48 | 13.48 | 13.39 | 13.41 | 13.34 | 13.34 |
| K2O | 3.48 | 2.82 | 2.45 | 3.91 | 3.32 | 2.76 | 2.29 | 2.56 | 2.49 | 2.49 |
| MgO | 5.49 | 5.48 | 5.86 | 5.88 | 5.09 | 5.35 | 5.86 | 5.48 | 5.48 | 4.98 |
| CaO | 0.05 | 0.54 | 0.57 | 0.12 | 0.06 | 0.05 | 1.23 | 1.35 | 0.28 | 0.28 |
| As2O3 | 0.28 | 0.25 | 0.4 | 0.36 | 0.01 | 0 | 0.37 | 0.38 | 0 | 0 |
| Sb2O3 | 0 | 0 | 0 | 0 | 0.41 | 0.06 | 0 | 0 | 0 | 0 |
| SnO2 | 0 | 0 | 0 | 0 | 0 | 0.23 | 0 | 0 | 0 | 0 |
| Fe2O3 | 0.01 | 0.01 | 0.01 | 0.01 | 0.01 | 0.03 | 0.01 | 0.01 | 0 | 0 |
| TiO2 | 0.02 | 0.02 | 0.01 | 0.02 | 0.02 | 0.02 | 0.02 | 0.02 | 0.65 | 0.65 |
| properties | | | | | | | | | | |
| strain point | 516 | 529 | 559 | 532 | 544 | 562 | 579 | 576.9 | | |
| anneal point | 560 | 574 | 608 | 579 | 593 | 612 | 628 | 626 | | |
| softening point | 757 | 786 | 843 | 814 | 838 | 862.8 | 858.5 | | | |
| CTE | | | | | | | | | | |
| density | 2.461 | 2.460 | 2.455 | 2.457 | | 2.453 | 2.46269 | 2.463 | | |
| Viscosity | | | | | | | | | | |
| T @ 200 p | 1544 | 1559 | 1613 | 1586 | 1608 | 1639 | 1640 | 1636 | | |
| T @ 35 kp | 1058 | 1081 | 1131 | 1110 | 1129 | 1153 | 1168 | 1166 | | |
| Liquidus | | | | | | | | | | |
| internal | 775 | 935 | 890 | 870 | 990 | 1025 | 980 | | | |
| liq. Visc. | 9.7E +06 | 5.4E +05 | 4.9E +06 | 3.3E +06 | 4.1E +04 | 2.9E +05 | 1026862 | | | |
| Ion Exchange | | | | | | | | | | |
| time | | 8 | 8 | — | — | — | — | — | — | — |
| Average DOL (μm) | — | 49 | 48 | — | — | — | — | — | — | — |
| Average $\sigma_t$ (Mpa) | — | 32.4 | 36.5 | — | — | — | — | — | — | — |

| | Example | | | | | | | | | | |
|---|---|---|---|---|---|---|---|---|---|---|---|
| | 32 | 33 | 34 | 35 | 36 | 37 | 38 | 39 | 40 | 41 | 42 |
| Mol % | | | | | | | | | | | |
| SiO2 | 66.53 | 66.53 | 66.28 | 66.03 | 65.53 | 64.53 | 66.53 | 66.53 | 66.53 | 66.53 | 66.53 |
| Al2O3 | 10.98 | 11.23 | 10.73 | 10.73 | 10.73 | 10.73 | 10.73 | 10.73 | 11.38 | 10.98 | 11.23 |
| B2O3 | 0 | 0 | 0.25 | 0.5 | 1 | 2 | 0.5 | 1 | 0 | 0 | 0 |
| Na2O | 13.34 | 13.34 | 13.34 | 13.34 | 13.34 | 13.34 | 13.34 | 13.34 | 13.34 | 13.34 | 13.34 |
| K2O | 2.49 | 2.49 | 2.49 | 2.49 | 2.49 | 2.49 | 2.49 | 2.49 | 2.49 | 2.49 | 2.49 |
| MgO | 5.73 | 5.48 | 5.98 | 5.98 | 5.98 | 5.98 | 5.48 | 4.98 | 5.98 | 5.73 | 5.48 |
| CaO | 0.28 | 0.28 | 0.28 | 0.28 | 0.28 | 0.28 | 0.28 | 0.28 | 0.28 | 0.28 | 0.28 |
| As2O3 | 0 | 0 | 0 | 0 | 0 | 0 | 0 | 0 | 0 | 0 | 0 |
| Sb2O3 | 0 | 0 | 0 | 0 | 0 | 0 | 0 | 0 | 0 | 0 | 0 |
| SnO2 | 0 | 0 | 0 | 0 | 0 | 0 | 0 | 0 | 0 | 0 | 0 |
| Fe2O3 | 0 | 0 | 0 | 0 | 0 | 0 | 0 | 0 | 0 | 0 | 0 |
| TiO2 | 0.65 | 0.65 | 0.65 | 0.65 | 0.65 | 0.65 | 0.65 | 0.65 | 0 | 0.65 | 0.65 |
| properties | | | | | | | | | | | |
| strain point | | | | | | | | | | | |
| anneal point | | | | | | | | | | | |
| softening | | | | | | | | | | | |

TABLE 1-continued

| Representative compositions. | | | | | | | | | | | |
|---|---|---|---|---|---|---|---|---|---|---|---|
| point CTE | | | | | | | | | | | |
| density | | | | | | | | | | | |
| Viscosity | | | | | | | | | | | |
| T @ 200 p | | | | | | | | | | | |
| T @ 35 kp | | | | | | | | | | | |
| Liquidus | | | | | | | | | | | |
| internal | | | | | | | | | | | |
| liq. Visc. | | | | | | | | | | | |
| Ion Exchange | | | | | | | | | | | |
| time | — | — | — | — | — | — | — | — | — | — | — |
| Average DOL (μm) | — | — | — | — | — | — | — | — | — | — | — |
| Average $\sigma_t$ (Mpa) | — | — | — | — | — | — | — | — | — | — | — |

TABLE 2

| Mol % | 43 | 44 | 45 | 46 | 47 | 48 | 49 | 50 | 51 |
|---|---|---|---|---|---|---|---|---|---|
| SiO2 | 64.16 | 66.16 | 66.16 | 64.16 | 66.16 | 63.79 | 64.24 | 66.58 | 67.16 |
| Al2O3 | 10.9 | 10.9 | 10.9 | 10.9 | 10.9 | 10.92 | 10.96 | 11.03 | 10.98 |
| B2O3 | 0 | 0 | 0 | 1.23 | 1.23 | 1.23 | 1.23 | 0 | 0 |
| Na2O | 13.41 | 12.41 | 11.41 | 13.41 | 11.41 | 13.54 | 13.48 | 13.27 | 13.41 |
| K2O | 4.33 | 3.33 | 4.33 | 4.33 | 4.33 | 4.335 | 3.73 | 2.5 | 2.56 |
| MgO | 5.72 | 5.72 | 5.72 | 5.72 | 5.72 | 5.72 | 5.92 | 5.56 | 5.54 |
| CaO | 0.62 | 0.62 | 0.62 | 0 | | 0 | 0.06 | 0.07 | 0.07 |
| As2O3 | 0.25 | 0.25 | 0.25 | 0.25 | 0.25 | 0.4 | 0.37 | 0.27 | 0.24 |
| TiO2 | 0.61 | 0.61 | 0.61 | 0 | 0 | 0 | 0 | 0.66 | 0.67 |
| Deficiency | $SiO_2$ + $B_2O_3$ + CaO too low | $Na_2O$—$Al_2O_3$ too low | $Na_2O$—$Al_2O_3$ too low | $SiO_2$ + $B_2O_3$ + CaO too low | $Na_2O$—$Al_2O_3$ too low | $SiO_2$ + $B_2O_3$ + CaO too low | $SiO_2$ + $B_2O_3$ + CaO too low | $Na_2O$ + $K_2O$ + $B_2O_3$ + MgO + CaO + SrO too low | $Na_2O$ + $K_2O$ + $B_2O_3$ + MgO + CaO + SrO too low |
| problem it causes | poor durability | melting T too high | melting T too high | poor durability | melting T too high | poor durability | poor durability | melting T too high | melting T too high |

The largest single constituent of the alkali aluminosilicate glass is $SiO_2$, which forms the matrix of the glass and is present in the inventive glasses in a concentration ranging from about 64 mol % up to and including about 68 mol %. $SiO_2$ serves as a viscosity enhancer that aids formability and imparts chemical durability to the glass. At concentrations that are higher than the range given above, $SiO_2$ raises the melting temperature prohibitively, whereas glass durability suffers at concentrations below the range. In addition, lower $SiO_2$ concentrations can cause the liquidus temperature to increase substantially in glasses having high $K_2O$ or high MgO concentrations.

When present in a concentration ranging from about 8 mol % up to and including about 12 mol %, $Al_2O_3$ enhances viscosity. At $Al_2O_3$ concentrations that are higher than this range, the viscosity can become prohibitively high, and the liquidus temperature may become too high to sustain a continuous down-draw process. To guard against this, the glasses of the present invention have a total concentration of alkali metal oxides (e.g., $Na_2O$, $K_2O$) that is well in excess of the total $Al_2O_3$ content.

Fluxes are used to obtain melting temperatures that are suitable for a continuous manufacturing process. In the aluminosilicate glass described herein, the oxides $Na_2O$, $K_2O$, $B_2O_3$, MgO, CaO, and SrO serve as fluxes. To satisfy the various constraints on melting, it is preferable that the temperature at 200 poise not be greater than 1650° C. To achieve this, the condition that $Na_2O+K_2O+B_2O_3+MgO+CaO+SrO—Al_2O_3>10$ mol % should be met.

Alkali metal oxides serve as aids in achieving low liquidus temperatures, and low melting temperatures. As used herein, the term "melting temperature" refers to the temperature corresponding to a glass viscosity of 200 poise. In the case of sodium, $Na_2O$ is used to enable successful ion exchange. In order to permit sufficient ion exchange to produce substantially enhanced glass strength, $Na_2O$ is provided in a concentration ranging from about 12 mol % up to and including about 16 mol %. If, however, the glass were to consist exclusively of $Na_2O$, $Al_2O_3$, and $SiO_2$ within the respective ranges described herein, the viscosity would be too high to be suitable for melting. Thus, other components must be present to ensure good melting and forming performance. Assuming those components are present, reasonable melting temperatures are obtained when the difference between the $Na_2O$ and $Al_2O_3$ concentrations ranges from about 2 mol % up to and including about 6 mol % (i.e., 2 mol % $\leq Na_2O—Al_2O_3 \leq$ 6 mol %).

Potassium oxide ($K_2O$) is included to obtain low liquidus temperatures. However, $K_2O$—even more so than $Na_2O$—can decrease the viscosity of the glass. Thus, the total difference between the sum of the $Na_2O$ and $K_2O$ concentrations and the $Al_2O_3$ concentration should be in a range from about 4 mol % up to and including about 10 mol % (i.e., 4 mol % $\leq (Na_2O+K_2O)—Al_2O_3 \leq$ 10 mol %).

$B_2O_3$ serves as a flux; i.e., a component added to reduce melting temperatures. The addition of even small amounts (i.e., less than about 1.5 mol %) of $B_2O_3$ can radically reduce melting temperatures of otherwise equivalent glasses by as much as 100° C. While, as previously mentioned, sodium is added to enable successful ion exchange, it may be desirable, at relative low $Na_2O$ contents and high $Al_2O_3$ contents, to add $B_2O_3$ to ensure the formation of a meltable glass. Thus, in one embodiment, the total concentration of $Na_2O$ and $B_2O_3$ is linked such that $(Na_2O+B_2O_3)—Al_2O_3 \leq 2$ mol %. Thus, in one embodiment, the combined concentration of $SiO_2$, $B_2O_3$, and CaO ranges from about 66 mol % up to and including about 69 mol % (i.e., 66 mol % $\leq SiO_2+B_2O_3+CaO \leq 69$ mol %).

When the total alkali metal oxide concentration exceeds that of $Al_2O_3$, any alkaline earth oxides present in the glass serve primarily as fluxes. MgO is the most effective flux, but is prone to form forsterite ($Mg_2SiO_4$) at low MgO concentrations in sodium aluminosilicate glasses, thus causing the liquidus temperature of the glass to rise very steeply with MgO content. At higher MgO levels, glasses have melting temperatures that are well within the limits required for continuous manufacturing. However, the liquidus temperature may be too high—and thus the liquidus viscosity too low—to be compatible with a down-draw process such as, for example, the fusion draw process. However, the addition of at least one of $B_2O_3$ and CaO can drastically reduce the liquidus temperature of these MgO-rich compositions. Indeed, some level of $B_2O_3$, CaO, or both may be necessary to obtain a liquidus viscosity that is compatible with fusion, particularly in glasses having high sodium, low $K_2O$, and high $Al_2O_3$ concentrations. Strontium oxide (SrO) is expected to have precisely the same impact on liquidus temperatures of high MgO glasses as CaO. In one embodiment, the alkaline earth metal oxide concentration is thus broader than the MgO concentration itself, such that 5 mol % $\leq MgO+CaO+SrO \leq 8$ mol %.

Barium is also an alkaline earth metal, and additions of small amounts of barium oxide (BaO) or substitution of barium oxide for other alkaline earths may produce lower liquidus temperatures by destabilizing alkaline-earth-rich crystalline phases. However, barium is considered to be a hazardous or toxic material. Therefore, while barium oxide may be added to the glasses described herein at a level of at least 2 mol % with no deleterious impact or even with a modest improvement to liquidus viscosity, the barium oxide content is generally kept low to minimize the environmental impact of the glass. Thus, in one embodiment, the glass is substantially free of barium.

In addition to the elements described above, other elements and compounds may be added to eliminate or reduce defects within the glass. The glasses of the present invention tend to exhibit 200 kpoise viscosities that are relatively high, between about 1500° C. and 1675° C. Such viscosities are typical of industrial melting processes, and in some cases melting at such temperatures may be required to obtain glass with low levels of gaseous inclusions. To aid in eliminating gaseous inclusions, it may be useful to add chemical fining agents. Such fining agents fill early-stage bubbles with gas, thus increasing their rise velocity through the melt. Typical fining agents include, but are not limited to: oxides of arsenic, antimony, tin and cerium; metal halides (fluorides, chlorides and bromides); metal sulfates; and the like. Arsenic oxides are particularly effective fining agents because they release oxygen very late in the melt stage. However, arsenic and antimony are generally regarded as hazardous materials. Accordingly, in one embodiment, the glass is substantially free of antimony and arsenic, comprising less that about 0.05 wt % of each of the oxides of these elements. Therefore, it may be advantageous in particular applications to avoid using arsenic or antimony at all, and using instead a nontoxic component such as tin, halides, or sulfates to produce a fining effect. Tin (IV) oxide ($SnO_2$) and combinations of tin (IV) oxide and halides are particularly useful as fining agents in the present invention.

The glass described herein is down-drawable; that is, the glass is capable of being formed into sheets using down-draw methods such as, but not limited to, fusion draw and slot draw methods that are known to those skilled in the glass fabrication arts. Such down-draw processes are used in the large-scale manufacture of ion-exchangeable flat glass.

The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet therethrough and into an annealing region. Compared to the fusion draw process, the slot draw process provides a thinner sheet, as only a single sheet is drawn through the slot, rather than two sheets being fused together, as in the fusion down-draw process.

In order to be compatible with down-draw processes, the alkali aluminosilicate glass described herein has a high liquidus viscosity. In one embodiment, the liquidus viscosity is at least 130 kilopoise (kpoise) and, in another embodiment, the liquidus viscosity is at least 250 kpoise.

In one embodiment, the alkali aluminosilicate glass described herein is substantially free of lithium. As used herein, "substantially free of lithium" means that lithium is not intentionally added to the glass or glass raw materials during any of the processing steps leading to the formation of the alkali aluminosilicate glass. It is understood that an alkali aluminosilicate glass or an alkali aluminosilicate glass article that is substantially free of lithium may inadvertently contain small amounts of lithium due to contamination. The absence of lithium reduces poisoning of ion exchange baths, and thus reduces the need to replenish the salt supply needed to chemically strengthen the glass. In addition, due to the absence of lithium, the glass is compatible with continuous unit (CU) melting technologies such as the down-draw processes described above and the materials used therein, the latter including both fused zirconia and alumina refractories and zirconia and alumina isopipes.

In one embodiment, the glass is strengthened by ion-exchange. As used herein, the term "ion-exchanged" is understood to mean that the glass is strengthened by ion exchange processes that are known to those skilled in the glass fabrication arts. Such ion exchange processes include, but are not limited to, treating the heated alkali aluminosilicate glass with a heated solution containing ions having a larger ionic radius than ions that are present in the glass surface, thus replacing the smaller ions with the larger ions. Potassium ions, for example, could replace sodium ions in the glass. Alternatively, other alkali metal ions having larger atomic radii, such as rubidium or cesium could replace smaller alkali metal ions in the glass. Similarly, other alkali metal salts such as, but not limited to, sulfates, halides, and the like may be used in the ion exchange process. In one embodiment, the down-drawn glass is chemically strengthened by placing it a molten salt bath comprising $KNO_3$ for a predetermined time period to achieve ion exchange. In one embodiment, the temperature of the molten salt bath is about 430° C. and the predetermined time period is about eight hours.

Down-draw processes produce surfaces that are relatively pristine. Because the strength of the glass surface is controlled by the amount and size of surface flaws, a pristine surface that has had minimal contact has a higher initial strength. When this high strength glass is then chemically strengthened, the resultant strength is higher than that of a surface that has been a lapped and polished. Chemical strengthening or tempering by ion exchange also increases the resistance of the glass to flaw formation due to handling. Accordingly, in one embodiment, the down-drawn alkali aluminosilicate glass has a warpage of less than about 0.5 mm for a 300 mm×400 mm sheet. In another embodiment, the warpage is less than about 0.3 mm.

Surface compressive stress refers to a stress caused by the substitution during chemical strengthening of an alkali metal ion contained in a glass surface layer by an alkali metal ion having a larger ionic radius. In one embodiment potassium ions are substituted for sodium ions in the surface layer of the glass described herein. The glass has a surface compressive stress of at least about 200 MPa. In one embodiment, the surface compressive stress is at least about 600 MPa. The alkali aluminosilicate glass has a compressive stress layer that has a depth of at least about 30 μm and, in one embodiment, the depth of the compressive stress layer is at least about 40 μm.

The replacement of smaller ions by larger ions at a temperature below that at which the glass network can relax produces a distribution of ions across the surface of the glass that results in a stress profile. The larger volume of the incoming ion produces compressive stress (CS) on the surface and tension in the center (CT) of the glass. The compressive stress is related to the central tension by the following relationship:

$$CS=CT\times(t-2DOL)/DOL;$$

where t is the thickness of the glass and DOL is the depth of exchange.

A lithium-free glass having a surface compressive stress of at least about 200 MPa, a surface compressive layer having a depth of at least about 30 μm, and a thickness of at least about 0.3 mm is also provided. In one embodiment, the compressive stress is at least about 600 MPa, the depth of the compressive layer is at least about 40 μm, and the thickness of the lithium-free glass is in a range from about 0.7 mm up to about 1.1 mm.

In one embodiment, the lithium-free glass comprises: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2+B_2O_3+CaO$≤69 mol %; $Na_2O+K_2O+B_2O_3+MgO+CaO+SrO>10$ mol %; 5 mol %≤MgO+CaO+SrO≤8 mol %; $(Na_2O+B_2O_3)—Al_2O_3$≤2 mol %; 2 mol %≤$Na_2O—Al_2O_3$≤6 mol %; and 4 mol %≤$(Na_2O+K_2O)—Al_2O_3$≤10 mol %, and has a liquidus viscosity of at least 130 kpoise. The liquidus viscosity in one embodiment is at least 250 kpoise.

A mobile electronic device comprising a cover plate, at least a portion of which is transparent, is also provided. Such mobile electronic devices include, but are not limited to, mobile communication devices such as personal data assistants, mobile telephones, pagers, watches, radios, laptop computers and notebooks, and the like. As used herein, a "cover plate" refers to a glass sheet or window that covers a visual display. At least a portion of the cover plate is transparent to allow viewing of the display. The cover plate may to some extent be resistant to shock, breakage, and scratching and finds application in those electronic devices where a window having high surface strength, hardness, and scratch resistance is desirable. In one embodiment, the cover plate is touch sensitive. A schematic representation of a top view of a mobile telephone is shown in FIG. 1. Mobile telephone 100 includes a cover plate 110 comprising the down-drawn alkali aluminosilicate and chemically strengthened glass described herein. In mobile telephone 100, cover plate 110 serves as a display window and is scratch resistant. Cover plate 110 is formed from any of the glasses described herein. A sheet of the glass is down-drawn and then cut to the desired shape and size of the cover plate. The glass sheet may, in one embodiment, be strengthened by ion exchange, as described herein. In one embodiment, the glass sheet and cover plate cut therefrom have a thickness ranging from about 0.3 mm up to and including about 3 mm. In another embodiment, the glass sheet and cover plate have a thickness ranging from about 0.3 mm up to and including about 1.5 mm. The cover plate may then be joined to the body of the mobile electronic device using an adhesive or other means known in the art.

A cover plate for a device such as, but not limited to, the mobile electronic devices described above as well as non-electronic watches and other like, is also provided. The cover plate is formed from any of the glasses described herein above.

The following examples illustrate the advantages and features of the invention and in are no way intended to limit the invention thereto.

EXAMPLE 1

Melting of a Glass of from Raw Materials

The following describes a method for making a glass having a nominal composition equivalent to Example 29 in Table 1. The following materials are mixed together in the masses indicated (quantities in grams):

| | |
|---|---|
| Silica sand, −200 mesh | 1224.42 |
| Alumina, 325 mesh | 322.21 |
| Boric acid | 24.12 |
| Soda ash | 452.95 |
| Potassium carbonate | 104.78 |
| Magnesia | 74.02 |
| Limestone | 15.78 |
| Arsenic pentoxide | 28.41 |

For various melting operations, it may be desirable to use coarser or finer alumina or silica; hydroxides of alumina, alkali metals, or alkaline earth metals; oxides, peroxides or superoxides of the alkali metals; peroxides of the alkaline earth metals; or carboxylates of the alkali or alkaline earth metals. Arsenic is present only as a fining agent, and adds nothing to the physical properties or ion exchange capability of the glass. Arsenic acid can be used instead of arsenic pentoxide. Alternatively, if gaseous inclusions can be avoided by other means such as, for example, vacuum fining or long residence time in a refining stage of melting, it may be acceptable to reduce or eliminate arsenic oxide, to replace it with antimony or tin oxide, or to eschew all these in favor of halide or sulfate raw materials to provide additional fining capacity.

The raw materials are mixed by vigorously shaking or stirring the materials together. If soft agglomerates are present, a more aggressive mixing method such as ball-milling may be appropriate. The well-mixed batch is transferred into a 1800 $cm^3$ platinum crucible contained within a refractory backer, and the crucible containing the batch and the backer are loaded into a furnace, heated at a temperature in a range from about 1575° C. up to and including about 1650° C., and held at temperature for 4 to 16 hours. After this time, the crucible is removed from the furnace and the glass is poured into a free-forming patty of glass on a cold steel plate, and then transferred to an annealing oven at 625° C. After 2 hours at temperature, the annealing oven is ramped to room temperature (about 25° C.) at a rate of about 2° C. per minute, after which time the glass is removed and subjected to further processing.

EXAMPLE 2

Ion Exchange of Glass Plates

The following example describes sample preparation and ion exchange experiments. A glass patty such as that made in Example 1 is cut into shapes suitable for ion exchange evaluation. For the purposes of this example, the preferred sample geometry for consistent comparison of different glasses is 1 mm thick by 5 mm wide by 40 mm in length, although in other applications, a larger or smaller sample may be desired. The sample is ground to appropriate dimensions and then given an optical polish on all surfaces. The samples are then cleaned in methyl ethyl ketone and dried at about 150° C. for 1 hour to eliminate any residual organic contamination. Each cleaned sample is suspended in a bath of molten $KNO_3$ and held at 430° C. so as to minimize points of contact between the glass and the holder or bath vessel. Other alkali salts, such as nitrates and halides of K, Rb, and Cs, may also be used. After eight hours in the bath, the sample is removed, allowed to cool, and washed in deionized water to remove any residual salt.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. An alkali aluminosilicate glass, the glass comprising: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)—$Al_2O_3$≤2 mol %; 2 mol %≤$Na_2O$—$Al_2O_3$≤6 mol %; and 4 mol %≤($Na_2O$+$K_2O$)—$Al_2O_3$≤10 mol %, and wherein the glass has a liquidus viscosity of at least 130 kpoise.

2. The glass according to claim 1, wherein the glass is down-drawable.

3. The glass according to claim 1, wherein the glass is substantially free of lithium.

4. The glass according to claim 1, wherein the glass is ion exchanged.

5. The glass according to claim 4, wherein the glass, when ion exchanged, has a surface compressive stress of the glass of at least about 200 MPa.

6. The glass according to claim 4, wherein the glass, when ion exchanged, has a surface compressive layer having a depth of at least about 30 μm.

7. The glass according to claim 1, wherein the glass has a liquidus viscosity of at least 250 kpoise.

8. The glass according to claim 1, wherein the glass has a thickness ranging from about 0.3 mm up to about 3 mm.

9. The glass according to claim 8, wherein the glass has a thickness ranging from about 0.3 mm up to about 1.5 mm.

10. The glass according to claim 9, wherein the glass has a warpage of less than about 0.5 mm, as determined for a 300 mm×400 mm sheet.

11. The glass according to claim 10, wherein the warpage is less than about 0.3 mm.

12. The glass according to claim 1, wherein the glass is a cover plate.

13. The glass according to claim 12, wherein the glass is a cover plate for a mobile electronic device.

14. The glass according to claim 1, wherein the glass is slot drawn or fusion drawn.

15. A lithium-free glass having a surface compressive stress of at least about 200 MPa, a surface compressive layer having a depth of at least in a range from [about 30] *40* μm up to about 100 μm, and a [thicknessof] *thickness of* at least about 0.3 mm.

16. The lithium-free glass according to claim 15, wherein the compressive stress is at least about 600 MPa, the depth of surface compressive layer is at least 40 μm, and the thickness is in a range from about 0.7 mm up to about 1.1 mm.

17. The lithium-free glass according to claim 15, wherein the glass comprises 64 mol %≤$SiO_2$≤68 mol %; 12 mol %≤$Na_2$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)—$Al_2O_3$≤2 mol %; 2 mol %≤$Na_2O$—$Al_2O_3$≤6 mol %; and 4 mol %≤($Na_2O$+$K_2O$)—$Al_2O_3$≤10 mol %, and wherein the glass has a liquidus viscosity of at least 130 kpoise.

18. The lithium-free glass according to claim 17, wherein the glass has a liquidus viscosity of at least 250 kpoise.

19. The lithium-free glass according to claim 15, wherein the glass has a thickness ranging from about 0.3 mm up to about 3 mm.

20. The lithium-free glass according to claim 19, wherein the glass has a thickness ranging from about 0.3 mm up to about 1.5 mm.

21. The lithium-free glass according to claim 15, wherein the glass is a cover plate.

22. The lithium-free glass according to claim 15, wherein the glass is a cover plate for a mobile electronic device.

23. The lithium-free glass according to claim 15, wherein the glass has a warpage of less than about 0.5 mm, as determined for a 300 mm×400 mm sheet.

24. The lithium-free glass according to claim 15, wherein the warpage is less than about 0.3 mm.

25. The lithium-free glass according to claim 15, wherein the lithium-free glass is fusion drawn or slot drawn.

26. A mobile electronic device, the mobile electronic device comprising an alkali aluminosilicate glass cover plate, the glass cover plate comprising: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)—$Al_2O_3$≤2 mol %; 2 mol %≤$Na_2O$—$Al_2O_3$≤6 mol %; and 4 mol %≤($Na_2O$+$K_2O$)—$Al_2O_3$≤10 mol %, and wherein the glass has a liquidus viscosity of at least 130 kpoise.

27. The mobile electronic device according to claim 26, wherein the glass cover plate is substantially free of lithium.

28. The mobile electronic device according to claim 26, wherein the glass cover plate is ion exchanged.

29. The mobile electronic device according to claim 28, wherein the glass cover plate, when ion exchanged, has a surface compressive stress at a surface of the glass of at least 200 MPa.

30. The mobile electronic device according to claim 28, wherein the glass cover plate, when ion exchanged, has a compressive surface layer having a depth of at least about 30 μm.

31. The mobile electronic device according to claim 26, wherein the glass cover plate has a liquidus viscosity of at least 250 kpoise.

32. The mobile electronic device according to claim 26, wherein the glass cover plate has a thickness ranging from about 0.3 mm up to about 3 mm.

33. The mobile electronic device according to claim 32, wherein the glass cover plate has a thickness ranging from about 0.3 mm up to about 1.5 mm.

34. The mobile electronic device according to claim 32, wherein the glass cover plate has a warpage of less than about 0.5 mm, as determined for a 300 mm×400 mm sheet.

35. The mobile electronic device according to claim 34, wherein the warpage is less than about 0.3 mm.

36. The mobile electronic device according to claim 26, wherein the glass is fusion drawn or slot-drawn.

37. An alkali aluminosilicate glass cover plate, the cover plate comprising:

64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)—$Al_2O_3$≤2 mol %; 2 mol %≤$Na_2O$—$Al_2O_3$≤6 mol %; and 4 mol %≤($Na_2O$+$K_2O$)—$Al_2O_3$≤10 mol %, and wherein the glass has a liquidus viscosity of at least 130 kpoise.

38. The cover plate according to claim 37, wherein the cover plate is substantially free of lithium.

39. The cover plate according to claim 37, wherein the cover plate is ion exchanged.

40. The cover plate according to claim 39, wherein the cover plate, when ion exchanged, has a surface compressive stress at a surface of the glass of at least about 200 MPa.

41. The cover plate according to claim 39, wherein the cover plate, when ion exchanged, has a compressive surface layer having a depth of at least about 30 μm.

42. The cover plate according to claim 37, wherein the cover plate has a liquidus viscosity of at least 250 kpoise.

43. The cover plate according to claim 37, wherein the cover plate has a thickness ranging from about 0.3 mm up to about 3 mm.

44. The cover plate according to claim 43, wherein the cover plate has a thickness ranging from about 0.3 mm up to about 1.5 mm.

45. The cover plate according to claim 43, wherein the cover plate has a warpage of less than about 0.5 mm, as determined for a 300 mm×400 mm sheet.

46. The cover plate according to claim 45, wherein the warpage is less than about 0.3 mm.

47. The cover plate according to claim 37, wherein the glass is fusion drawn or slot-drawn.

*48. An alkali aluminosilicate glass, the glass comprising:*

*64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; 2 mol %≤$Na_2O$—$Al_2O_3$≤6 mol %; and 4 mol %≤($Na_2O$+$K_2O$)—$Al_2O_3$≤10 mol %, and wherein the glass has a liquidus viscosity of at least 130 kpoise.*

*49. A mobile electronic device, the mobile electronic device comprising an alkali aluminosilicate glass cover plate, the glass cover plate comprising:*

*64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; 2 mol %≤$Na_2O$—$Al_2O_3$≤6 mol %; and 4 mol %≤($Na_2O$+$K_2O$)—$Al_2O_3$≤10 mol %, and wherein the glass has a liquidus viscosity of at least 130 kpoise.*

*50. An alkali aluminosilicate glass cover plate, the cover plate comprising:*

*64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; 2 mol %≤$Na_2O$—$Al_2O_3$≤6 mol %; and 4 mol %≤($Na_2O$+$K_2O$)—$Al_2O_3$≤10 mol %, and wherein the glass has a liquidus viscosity of at least 130 kpoise.*

*51. The lithium-free glass according to claim 15, wherein the glass has a liquidus viscosity of at least 130 kpoise.*

*52. The lithium-free glass according to claim 15, wherein the glass has a liquidus viscosity of at least 250 kpoise.*

*53. The lithium-free glass according to claim 51, wherein the compressive stress is at least about 600 MPa, the depth of surface compressive layer is at least 40 μm, and the thickness is in the range from about 0.7 mm up to about 1.1 mm.*

*54. The lithium-free glass according to claim 51, wherein the glass comprises:*

*64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; 2 mol %≤$Na_2O$—$Al_2O_3$≤6 mol %; and 4 mol %≤($Na_2O$+$K_2O$)—$Al_2O_3$≤10 mol %.*

*55. The lithium-free glass according to claim 54, wherein the glass has a liquidus viscosity of at least 250 kpoise.*

*56. The lithium-free glass according to claim 51, wherein the glass has a thickness ranging from about 0.3 mm up to about 3 mm.*

*57. The lithium-free glass according to claim 56, wherein the glass has a thickness ranging from about 0.3 mm up to about 1.5 mm.*

*58. The lithium-free glass according to claim 51, wherein the glass is a cover plate.*

*59. The lithium-free glass according to claim 51, wherein the glass is a cover plate for a mobile electronic device.*

*60. The lithium-free glass according to claim 51, wherein the glass has a warpage of less than about 0.5 mm, as determined for a 300 mm×400 mm sheet.*

*61. The lithium-free glass according to claim 51, wherein the warpage is less than about 0.3 mm.*

*62. The lithium-free glass according to claim 51, wherein the lithium-free glass is fusion drawn or slot drawn.*

*63. A glass substantially free of lithium having a surface compressive stress of at least about 200 MPa, a surface compressive layer having a depth of at least in a range from 40 μm up to about 100 μm, and a thickness of at least about 0.3 mm.*

*64. The glass substantially free of lithium according to claim 63, wherein the glass has a liquidus viscosity of at least 130 kpoise.*

*65. The glass substantially free of lithium according to claim 63, wherein the glass has a liquidus viscosity of at least 250 kpoise.*

*66. The glass substantially free of lithium according to claim 63, wherein the compressive stress is at least about 600 MPa, the depth of surface compressive layer is at least 40 μm, and the thickness is in the range from about 0.7 mm up to about 1.1 mm.*

*67. The glass substantially free of lithium according to claim 63, wherein the glass comprises:*

*64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤MgO≤6 mol %; and 0 mol %≤CaO≤5 mol %, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; 2 mol %≤$Na_2O$—$Al_2O_3$≤6 mol %; and 4 mol %≤($Na_2O$+$K_2O$)—$Al_2O_3$≤10 mol %, and wherein the glass has a liquidus viscosity of at least 130 kpoise.*

*68. The glass substantially free of lithium according to claim 67, wherein the glass has a liquidus viscosity of at least 250 kpoise.*

*69. The glass substantially free of lithium according to claim 63, wherein the glass has a thickness ranging from about 0.3 mm up to about 3 mm.*

*70. The glass substantially free of lithium according to claim 69, wherein the glass has a thickness ranging from about 0.3 mm up to about 1.5 mm.*

*71. The glass substantially free of lithium according to claim 63, wherein the glass is a cover plate.*

*72. The glass substantially free of lithium according to claim 63, wherein the glass is a cover plate for a mobile electronic device.*

*73. The glass substantially free of lithium according to claim 63, wherein the glass has a warpage of less than about 0.5 mm, as determined for a 300 mm×400 mm sheet.*

*74. The glass substantially free of lithium according to claim 63, wherein the warpage is less than about 0.3 mm.*

*75. The glass substantially free of lithium according to claim 63, wherein the glass is fusion drawn or slot drawn.*

* * * * *